April 16, 1957 — L. F. DAVIES — 2,788,593
CONSTANT TRACKING DEVICE FOR AN AIRPLANE ON COURSE
Filed July 2, 1954 — 2 Sheets-Sheet 1

LEE F. DAVIES
*INVENTOR.*

BY Smith & Tuck

April 16, 1957 L. F. DAVIES 2,788,593
CONSTANT TRACKING DEVICE FOR AN AIRPLANE ON COURSE
Filed July 2, 1954 2 Sheets-Sheet 2
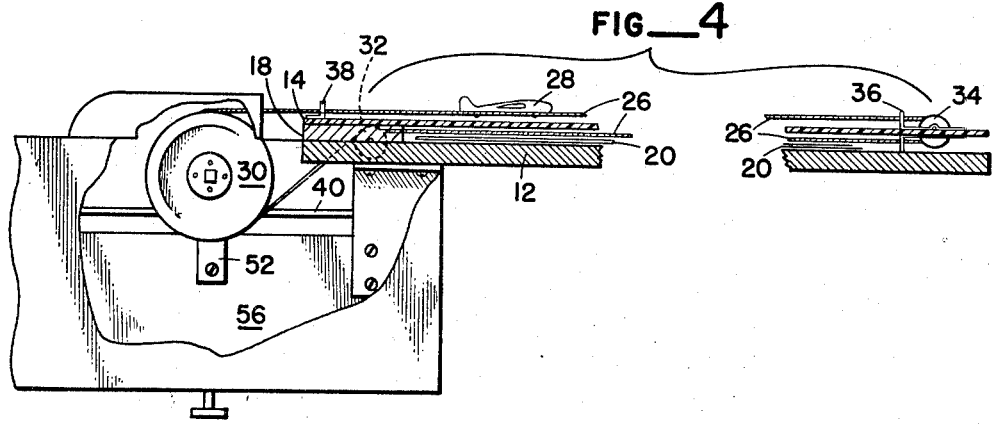
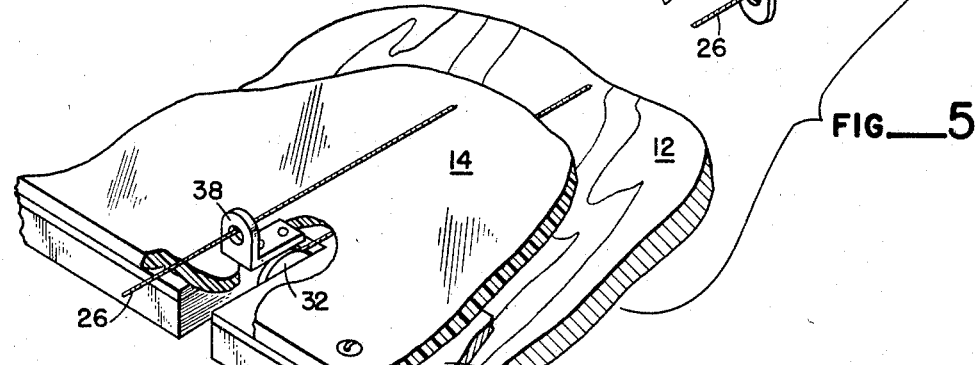
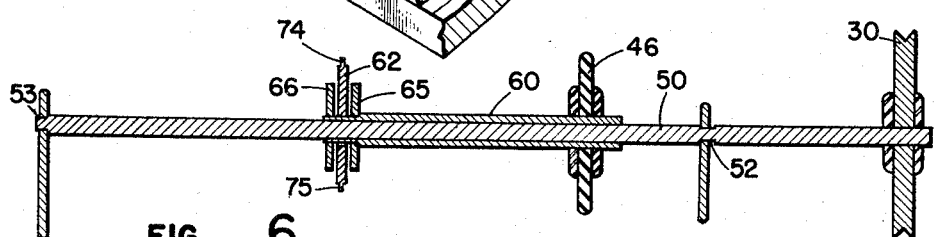
LEE F. DAVIES
INVENTOR.
BY
Smith & Tuck United States Patent Office 2,788,593
Patented Apr. 16, 1957

2,788,593

CONSTANT TRACKING DEVICE FOR AN AIRPLANE ON COURSE

Lee F. Davies, Bothell, Wash.

Application July 2, 1954, Serial No. 440,890

4 Claims. (Cl. 40—32)

The present invention relates generally to the art of airplane navigation aids and, more particularly to a tracking device in which a spring wound motor drives an airplane marker along the base line of the device at a speed that is proportional to the speed of the airplane reduced to the scale of the map being used. The top of the device upon which the base line is engraved is formed of transparent material and a flight map is folded so that it can be placed under the transparent sheet with the intended course in coincidence with the graduated space lines. Means are further provided for changing the speed of travel of the airplane marker to compensate for unfavorable flying conditions such as a head wind or a tail wind or any other conditions which might affect the speed of the plane to the end that the speed of the marker can be adjusted to indicate, on the map, the true progress of the airplane.

In the past many excellent devices have been produced as an aid in the navigation of airplanes. Those that have been observed, however, have been complicated and because of their complication, expensive in first cost. Further, most of the navigation aid devices are dependent upon intelligence or energy received from the moving plane and therefore the same must be accurately adjusted to the airplane with which it is used. Such a construction is bulky and in effect becomes a permanent fixture with the airplane.

In this present invention a constant tracking device is provided in very compact form and of a construction that makes it self-contained. The small size and simplified construction makes it then possible for the pilot to carry the device with him as he changes from one light plane to another. Because of the simplicity, small bulk, and low cost of this present device, it lends itself admirably for use with the light personal planes used by amateur or part-time pilots and gives to this class of flying personnel and equipment a navigation aid which in the past has only been associated with large expensive airplanes.

The principal object of this present invention, therefore, is to provide a constant tracking device which will show the progress of an airplane along its intended course.

A further object of this invention is to produce a tracking device that is self-contained, and because of its simple and compact construction, can be made cheaply so as to be readily available, especially for the users of light aircraft.

A further object of this invention is to provide a tracking device which makes use of the standard flight maps which can be folded and placed in the device and then the indicating mechanism will show the current position of the plane with respect to its progress along the intended flight line.

A further object of this invention is to provide means whereby the mechanism may be adjusted to the speed of the plane so that as flying conditions change and a change of speed or direction is made along the line of flight, a readjustment can be made so as to cause the indicator to synchronize with the continued progress of the plane.

Further objects, advantages and capabilities will be apparent from the description and disclosure in the drawings, or may be comprehended or are inherent in the device.

In the drawings:

Figure 4 is a bracketed view showing a side elevation of this tracking device with certain parts broken away and sectioned to better illustrate the structure;

Figure 5 is a fragmentary, bracketed, perspective view illustrating certain parts of the indicator drive; and Figure 6 is a vertical sectional view taken through the drive shaft.

Figure 1:
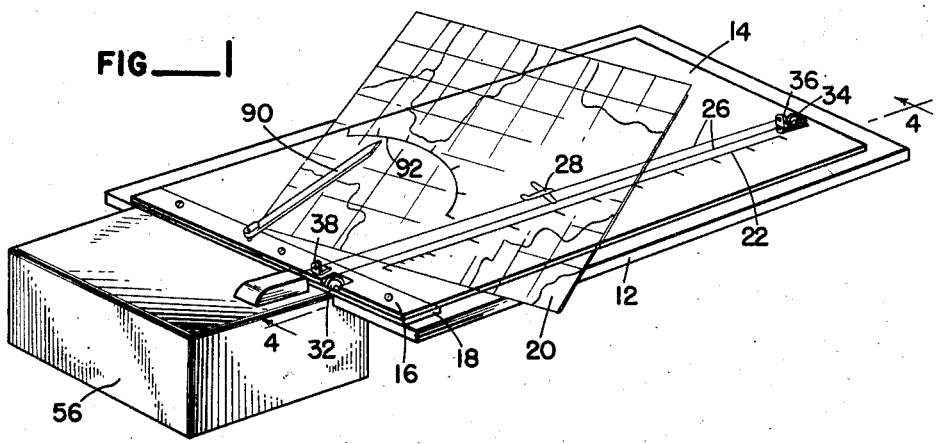
Figure 1 is a perspective view showing a device made after the teachings of the present invention and illustrating the manner in which the same is set up for use.

Referring more particularly to the disclosure in the drawings, the numeral 12 designates the base of this tracking device which should be made of relatively light, but stiff material. Plywood or the equivalent has been found very satisfactory. Disposed upon base 12 is a transparent cover 14 which is preferably secured at one end only as at 16 to base 12. As will be noted in Figures 1 and 5, the cover is spaced somewhat from base 12 as by the filler member 18. This is to provide space for the navigation map 20 which normally is disposed under the cover and on the upper surface of base 12. Suitably printed or engraved on the cover 14 is the base line and scale 22. In using the device it is normal to draw the course on a navigation map 20 and then place this line in coincidence with the base line. It is customary to graduate the base line in the same units and scale as the grid of map 20. However, as the base line rarely would coincide with either of the intersecting grid lines, the base line scale, in effect, becomes a measuring device for the distance of the course as indicated on the map.

Disposed above the base line is a flexible line 26 whose function is to move the airplane indicator 28 along the line indicating the intended course of the airplane. It is desirable that the flexible line be of light weight and flexible, as it must be passed around relatively small sheaves. Suitable material for this line is a thread which has been treated to give it resistance to moisture and the like, or some of the finer plastics monofilaments are quite satisfactory. Line 26 is driven by a variable speed sheave or ground pulley 30 around which the line passes to receive its driving force. Suitable additional sheaves are provided as sheave 32 and sheave 34. Sheave 34, together with suitable guide means, as 36, are preferably secured to the upper surface of the transparent cover so that it will not in any way interfere with the free movement of the map underneath this cover. At the driving end and adjacent sheave 32 a second guide means as 38 is provided. These guide means serve a dual purpose in that they insure that the line carrying the indicator 28 will always be accurately positioned and they also guard against the possibility of the line jumping off or being moved off the sheaves.

As this tracking device may be used with air planes of various speed capabilities and also due to the fact that any given airplane can have its speed changed, by varying climatic conditions, by the will of the pilot, or by conditions beyond his control, it is therefore desirable that means be provided so that the speed of moving indicator 28 be adjustable and variable while the airplane is in flight. A suitable means to effect this variation is indicated in the drawings in Figures 2, 3 and 6, in which a turntable 40 is driven at a constant speed, such as by the clockwork mechanism indicated briefly in Figure 3 at 42. This clockwork mechanism need not have a very great amount of output, in fact that mechanism normally employed in the average alarm clock is adequate for the purpose of driving this relatively light mechanism. Such alarm clocks are usually key-wound as by key 44 and when started will continue to run at a uniform speed for several hours under the control of the balance wheel escapement normally forming part of the average alarm clock mechanism. Using an alarm clock mechanism as a motive power, disc 40 should be attached to the spindle which normally drives the minute hand. This gives a relatively slow turning of disc 40 and thus achieves the tremendous speed reduction which is required if marker 28 is to traverse the map course at its proportionately greatly reduced lineal speed.

Adapted to engage the upper surface of plate 40 in driving relationship is the preferably rubber-tired driving pulley 46. As pulley 46 must be pressed firmly against plate 40, it has been found expedient to employ two or more supporting rollers or wheels, as 48, so that there will be no tendency to depress the driven side of plate 40 as might occur particularly when the driving pulley is well out to the outer margin.

In order to vary the speed of driving indicator 28 it is necessary, following the principles of friction drives, that pulley 46 be movable substantially along a radius of disc 40. This movement is effected by providing the supporting shaft 50 as a deformed shaft, for instance, a square shaft which should be provided of course with the usual cylindrical bearings at 52 and 53 which bearings in turn are secured to housing 56 and thus position shaft 50 with respect to housing 56. Disposed for longitudinal movement upon shaft 50 is a tube 60 which is deformed so as to suitably engage shaft 50. Also disposed on tube 60 and spaced apart from pulley 46 is the shifter yoke or collar 62. At the point where collar 62 is mounted on tube 60 the tube is preferably turned, as on a lathe, to produce at least a partially cylindrical bearing so that the collar or yoke may have a round axial hole to serve as a bearing. Collar 62 is preferably provided with longitudinally positioning collars, as 65 and 66, which collars are in turn fixedly secured to shaft 60 and turn with it. With this construction wherein pulley 46 and yoke 62 are both fixedly positioned longitudinally upon tube 60, any force applied to yoke 62 will be applied to pulley 46 to move it across the face of disc 40.

Figure 2:
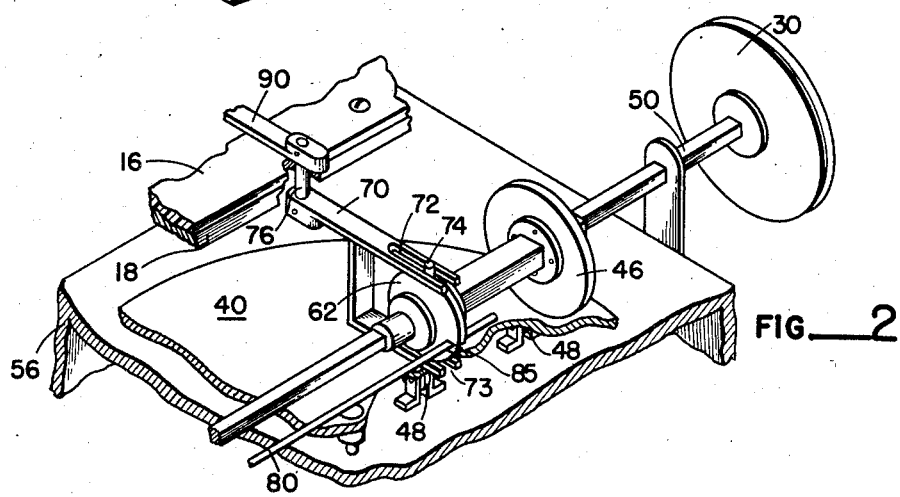
Figure 2 is a perspective view, partly in section, illustrating certain parts of the variable speed drive mechanism and the manner in which the speed indicator is operated.
Figure 3:
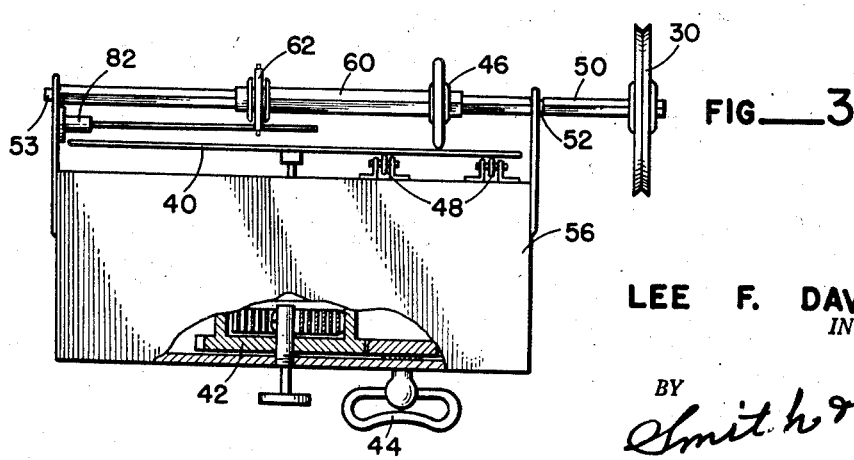
Figure 3 is a vertical end view, partly in section, illustrating the variable speed drive means employed.

A suitable shifting mechanism for yoke 62 is illustrated in Figure 2 wherein a shifter fork 70 having two bifurcated portions as 72 and 73 which operatively engage out-standing detents as 74 and 75 formed as part of yoke 62. Shifter 70 is pivotably supported on the revolvable bearing member 76 to which it is fixedly secured. Bearing 76 is revolvably supported within a bearing formed in base 12 and spacer member 18. The bifurcated ends 72 and 73 permit the engagement of yoke 62 by shifter 70 throughout the full range of movement of the yoke as pulley 46 is variously positioned. It is however, with this construction, desirable that yoke 62 be prevented from turning and this is provided by the stop or guide member 80 which is fixedly supported as by bearing 82, which in turn is supported from bearing member 53, as will be noted in Figure 3. This guide member fits within a slot 85 cut in the periphery of the yoke member.

On the upper end of bearing shaft 76 there is fixedly secured the speed adjusting lever 90 which also serves as a speed indicator on an arcuate scale 92 suitably printed or engraved on the surface of transparent cover 14. It will be observed, it is believed, that as pointer 90 is moved the speed scale 92 will through the effect of shifter 70 move the tubular shaft 60 which, in turn, carries the driven pulley 46 so as to change the contact position of this pulley to various radii and this, in turn, determines the driving speed given to sheave 30 and finally the speed imparted to the flexible line 36. With the arrangement shown, disc 40 is driven at a uniform speed and once the position of pulley 46 is determined, the drive will be uniform to the indicator 28. If, however, the pilot notes as he passes over some position on the map that the indicator is lagging him or is ahead of him, he can then make an adjustment in the speed by means of lever 90 so as to bring the speed of indicator 28 into synchronization with his actual ground speed. This is a very important feature and contributes a great deal to the workability of this relatively simple tracking device. When the pilot has the indicator speed synchronized with his own ground speed, he can then, by means of base line scale 22, actually predict his arrival time from any point in his course because he actually knows exactly where he is on map 20.

The action of this tracking device then provides all the useful data that can be obtained by careful dead reckoning or by a navigator plotting a course from ground observations, yet the whole device is very small and does not require any attention on the part of the pilot once he has synchronized his speed on the tracking device with his ground speed.

There is a decided advantage further in having a simple device that will accept any of the small flight maps. This is in distinction to many of the complicated devices that have been produced in the past which quite often will have the standardized courses the airplane is usually flying either on endless belts or on strip belts which are unwound from one roller and wound up on another. The flexibility of this device therefore lends itself particularly to the navigation of small planes which quite often are solely occupied by the owner-pilot or the renting pilot, or if this pilot does have passengers, they are usually just passengers and cannot be expected to assist in the navigation of the plane.

It is believed that it will be clearly apparent from the above description and the disclosure in the drawings that the invention comprehends a novel construction of a constant tracking device for an airplane on course.

Having thus disclosed the invention, I claim:

1. Mechanical means for tracking an airplane course on a conventional map, comprising: a baseboard and a superposed transparent cover secured to the base at one end and providing space therebetween and a removable conventional map having a projected course marked thereon positioned stationary between said cover and base and said cover having a reference course line marked thereon and said map being folded to expose said projected source and adjusted in position to bring projected course and reference course line into coincidence, a drive pulley and a driven pulley supported by said cover and base and a flexible endless line supported by said pulleys to follow a path of travel including a straight run on a level above the level of said map and having a traveler indicator secured to said endless line to travel therewith along said straight run and along said reference course line; and power means connected to said drive pulley and manually operable control means to control said power means and indicator means indicating the setting of said control means in terms of airplane speed and said traveler indicator being driven along said map by said power means at a speed corresponding in the map scale to the speed indicated by said indicator means.

2. Means for indicating speed of travel along a course on a map, comprising: a baseboard and a transparent cover superposed on said board and a removable map having a projected course line which is positioned between said base and cover and said cover having a reference straight course line scribed thereon superposed to said projected map course, a driven pulley and a drive pulley positioned on said cover at opposite ends of said reference course line and having an endless flexible line positioned thereon carrying a traveler indicator along said reference line, an alarm clock spring mechanism having a broad horizontal disc replacing its minute hand and a friction wheel supported above said alarm clock mechanism in contact with said disc and manually adjustable radially thereof and said friction wheel and said drive pulley being connected together whereby the rate of travel of said traveler along said reference course line is controlled by the position of said friction wheel.

3. The subject matter of claim 2 in which there are means for adjusting the position of said friction wheel which includes an arm manually adjustable in position and having an indicator which has a scale reading in the rate of miles per hour of the movement of said traveler in scale on said map.

4. Means for indicating the travel of an airplane along a course on a conventional type of map, comprising: a baseboard and a transparent cover superposed on said baseboard and spaced therefrom permitting the insertion of such map therebetween, a straight course line scribed on said cover and graduated to a scale common in such maps, one end of said cover being free from said base and a driven pulley mounted at said free end of said cover at one end of said course line, said cover and base supporting a drive pulley at the other end of said cover and course line and a flexible endless line supported by said pulleys and a traveler secured to said endless line, power means for said drive pulley and a manually operable control for the power means operable to change the speed of said drive pulley and said control including a pointer and a speed indicating graduated scale on said cover to which said pointer relates and said pointer indicating a speed on said graduated scale which is reproduced in scale in the movement of said traveler along said graduated course line.

References Cited in the file of this patent

UNITED STATES PATENTS

| | | |
|---|---|---|
| 1,077,596 | Clark | Nov. 4, 1913 |
| 1,342,793 | Castner | June 8, 1920 |
| 1,842,067 | Bredouw | Jan. 19, 1932 |
| 1,873,126 | Hugershoff | Aug. 23, 1932 |
| 1,916,734 | Logan | July 4, 1933 |
| 2,420,673 | Monrad | May 20, 1947 |
| 2,514,541 | Garrison | July 11, 1950 |